Aug. 28, 1956    R. J. FINDLETON    2,760,450
BOWSTRING TRUSS AND METHOD OF MAKING THE SAME
Filed Aug. 4, 1953    3 Sheets-Sheet 1
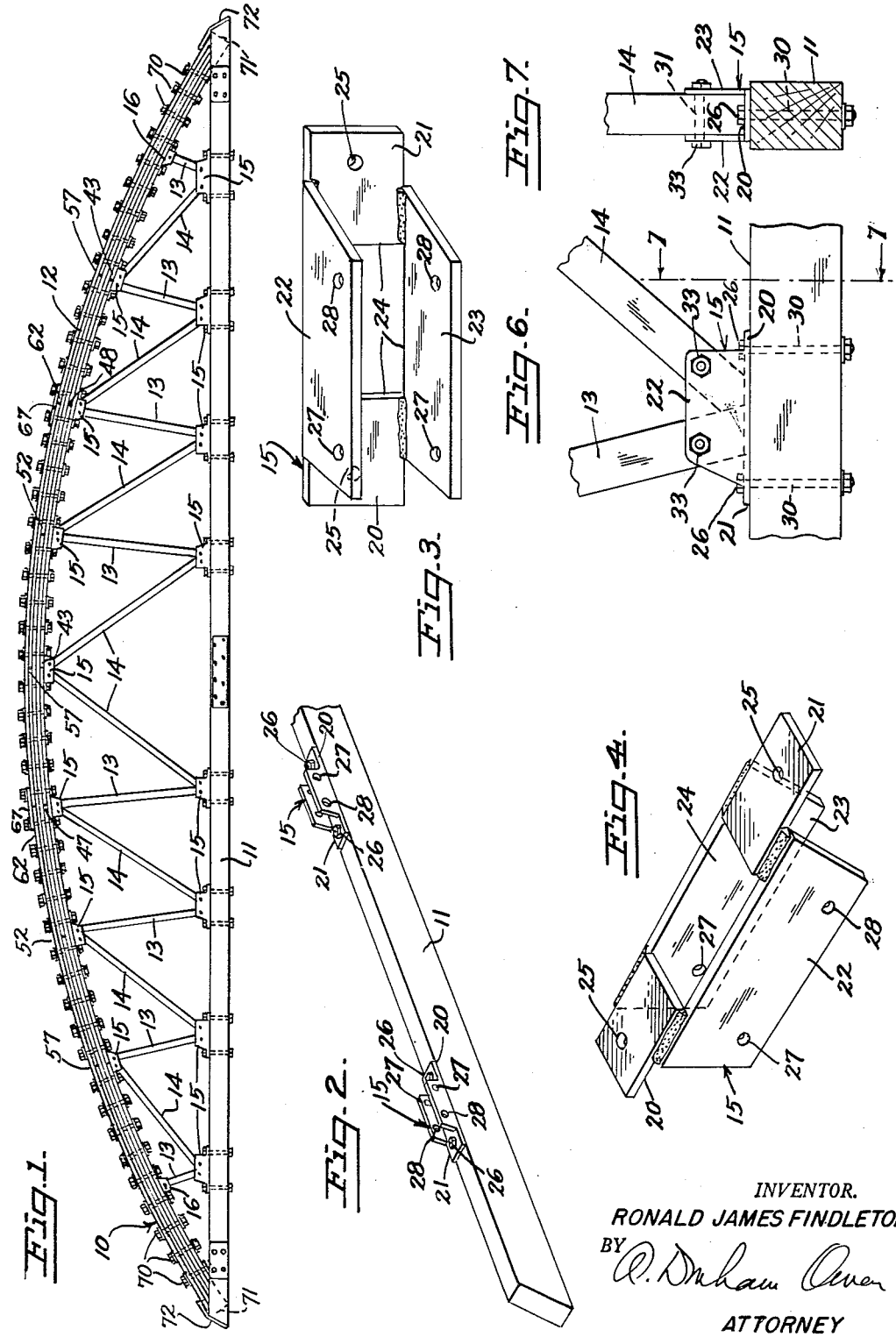
INVENTOR.
RONALD JAMES FINDLETON
BY
ATTORNEY

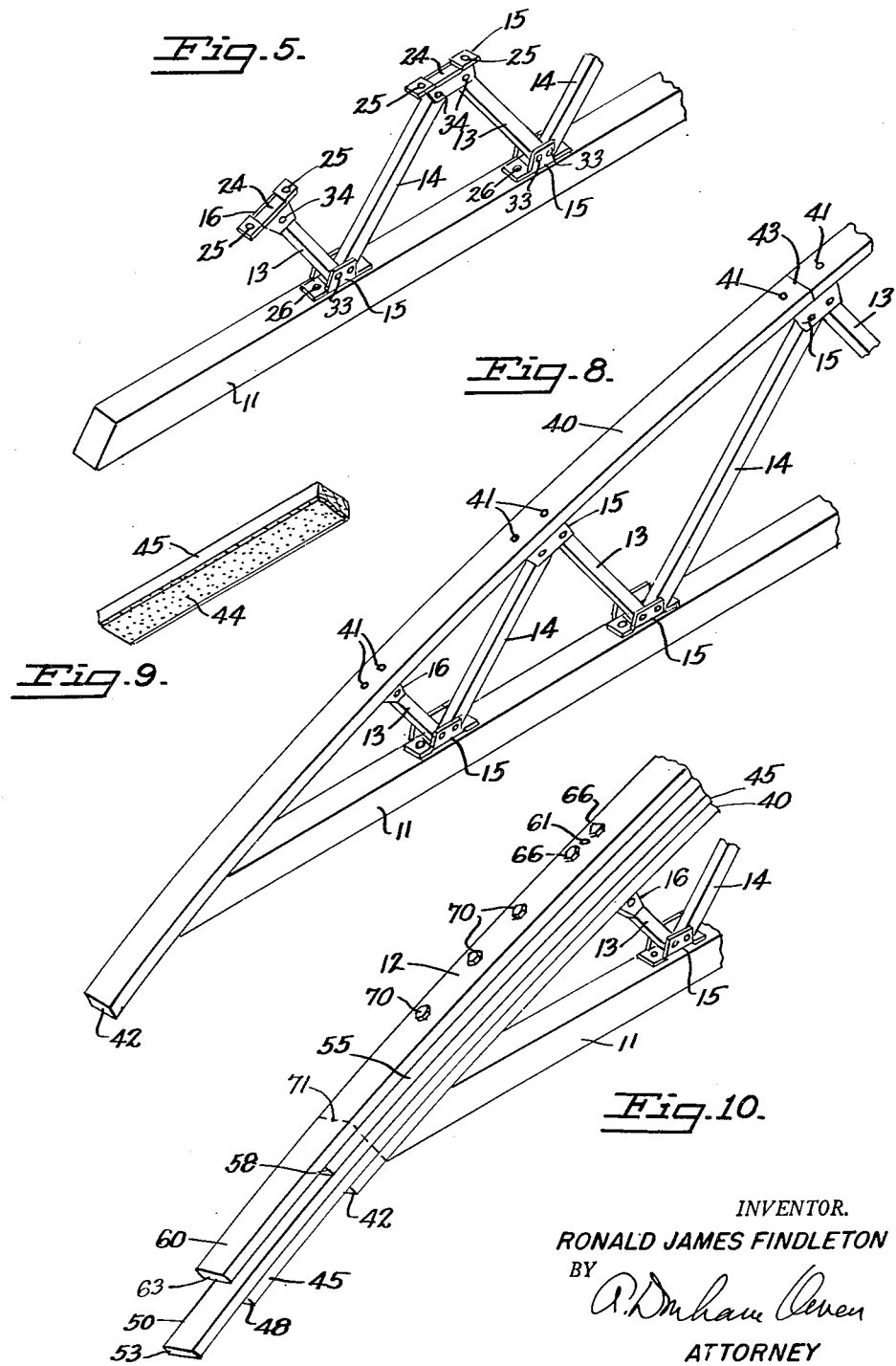

Aug. 28, 1956  R. J. FINDLETON  2,760,450
BOWSTRING TRUSS AND METHOD OF MAKING THE SAME
Filed Aug. 4, 1953  3 Sheets-Sheet 3
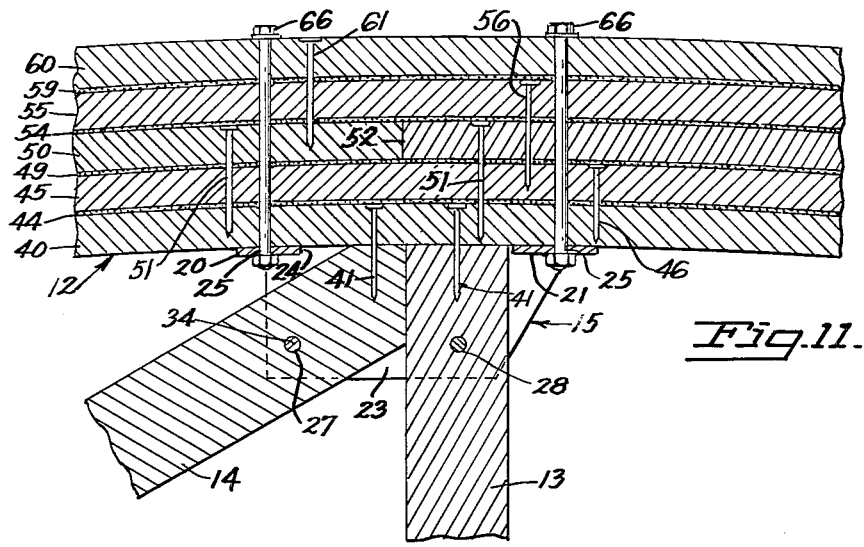
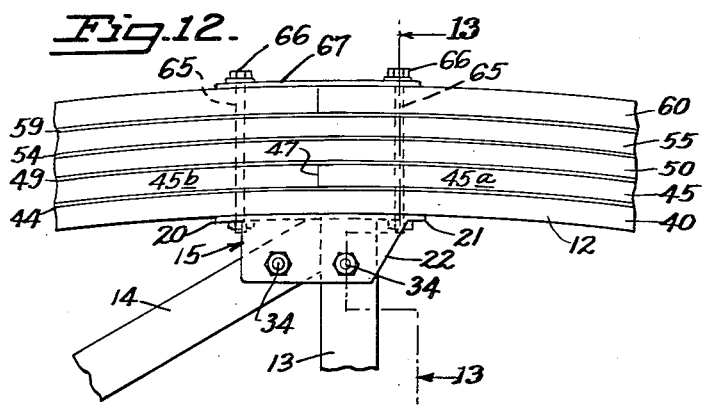
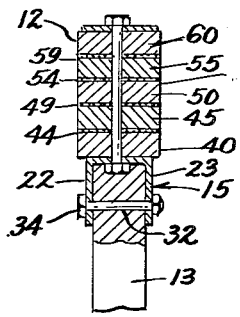
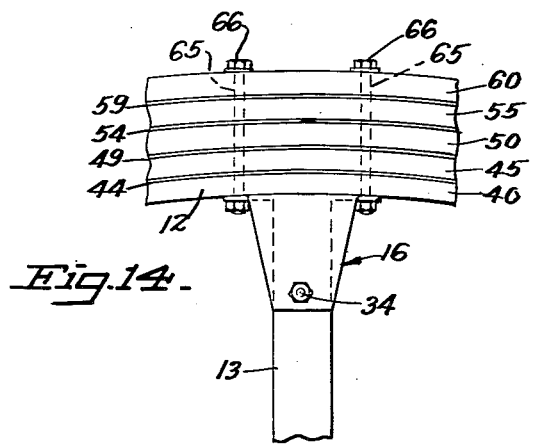
INVENTOR.
RONALD JAMES FINDLETON
BY
ATTORNEY United States Patent Office 2,760,450
Patented Aug. 28, 1956

2,760,450

BOWSTRING TRUSS AND METHOD OF MAKING THE SAME

Ronald James Findleton, Lafayette, Calif., assignor to Easybow Engineering & Research Co., Oakland, Calif., a corporation of California Application August 4, 1953, Serial No. 372,262

14 Claims. (Cl. 108—23)

This invention relates to improvements in bowstring trusses and to an improved method for constructing bowstring trusses—wooden trusses having a horizontal lower chord and a curved upper chord with supporting web members running between the two chords. More particularly, the invention relates to the construction of bowstring trusses having a laminated upper chord.

This application is a continuation-in-part of my earlier filed application Serial No. 274,613, filed March 3, 1952. This previous application disclosed and claimed a connection member for joining the webs to the chords in trusses. It also described an improved method of constructing trusses, made possible by employing that connecting member. The present application relates to that construction method and also to improvements made subsequently, whereby a glued laminated upper chord may be provided. This glued chord is far stronger than non-glued laminated chords; yet the method of manufacture is far less expensive than the methods which have heretofore been used for producing trusses with either a glued or a non-glued laminated upper chord. For purposes of comparison, two prior-art methods of constructing bowstring trusses will be briefly reviewed.

Heretofore, a glued laminated upper chord had to be built in a gluing plant that was provided with special bucks or jigs for imparting the necessary curve to the chord. Different curves had to be provided for different lengths of chords; so there had to be a number of gluing bucks, each of which were expensive, and more than $100,000 was required to set up the gluing plant alone. Glue was applied to the laminations by expensive special machines, and the laminations were held together under pressure in the gluing bucks and remained there until dry. This meant that only a few chords could be made at a time without having an excessively large number of expensive bucks, a factor that increased the cost of making a glued upper chord. When the chord had been glued together, it was removed from the gluing bucks and shipped to another factory, where it was combined with the webs and the lower chord in the truss assembly. Even though considerable pressure was applied in the bucks to give the upper chord its proper curve, there was always a tendency for the wood to straighten out after it had been removed from the bucks, in spite of the glue between laminations, and this meant that the chord had to be forced back into shape when the truss was assembled. It also meant additional expense during assembly. As a result, glued laminated upper chords were not constructed in large quantities in spite of their greater strength and other superiorities over non-glued chords.

Heretofore, the most economical method of constructing a truss having a laminated upper chord was to use a split chord construction; in other words, the upper chord and the lower chord were each made in two identical sections, and the webs were in between. Split-chord trusses were built by starting with one of the two lower chord halves and laying out the places where the webs were to be secured, spiking pre-cut webs in place on this lower chord half, turning the chord over, and spiking the other half of the lower chord in place on the other side of the webs. Then, with the lower chord and the webs lying on the ground, one-half of the upper chord was built up on top of the webs. To do this, the lowest lamination was spiked to the webs by driving nails through the side of the web. In this step the workers always had to try (often unsuccessfully) to avoid putting nails where the bolt holes would be drilled later. Then the second lamination was nailed to the first lamination and usually also to the web. More laminations were added and nailed to preceding laminations until half of the upper chord was built up. Then the truss was turned over and the other half of the upper chord was built in the same manner.

The next step was to align the two upper chord halves together, because the nails never held the chords in perfect alignment. Then bolt holes were drilled through both the upper and lower chords and the webs, and it was difficult to keep these holes straight and to avoid the nails. It took an experienced crew to place all the nails in the right location, the long distances that had to be drilled increased the difficulty of having the bolt holes in line. Then the lamination bolts were installed in the upper chord, and the holes for these bolts had to be straight and could not be located too close to the edge; otherwise the truss would be condemned. Then the web bolts were installed in the lower chord. If, as was usual, each lower chord half was made in two lengthwise collinear sections, splice bolts and splice plates were applied next, and it was always difficult to get the sections properly aligned. The next step was to cut off the ends of the upper chord and install the shoe and the shoe bolts; here again it was difficult to match the holes in the steel with those in the wood because of the great thickness involved in drilling through the split-chord. The resultant product was inferior to trusses having glued upper chords, but was much less expensive.

The method of the present invention produces a glued laminated upper chord without using special glue bucks, because the lower chord and the webs are used as the gluing buck on each truss. At the same time, the new method is even less expensive than the split-chord type of construction. The assembly of the present truss—a superior truss—takes between about one-quarter and one-half as long as previous trusses took.

In the present invention the webs are bolted directly to the lower chord, using web connecting members of the type shown in application, Serial No. 274,613, so that temporary spiking to the lower chord is unnecessary. Similar connection members are bolted to the outer ends of the web, and then the lowest lamination of the upper chord is spiked directly to the end of the webs. Because of the novel web connecting member, the nail passes through the thickness, rather than the width of the lamination and extends directly into the center of the web end, rather than transverse to the web. The lower chord, the webs, and the first lamination form the "gluing buck" for the upper chord. A ribbon of glue is therefore applied to the surface of the next lamination, which is then placed against the first lamination and spiked to it, it being easy to locate these spikes where they will not interfere with the bolt holes later on. The gluing and spiking continues until the upper chord is built to its full thickness. Then holes are bored in the upper chords and the web connections are bolted on. Additional holes are bored at regular intervals between the web connections, and bolts are inserted through these holes. Then all of the bolts are tightened to hold the laminations together under pressure while the glue sets. The ends of the upper chord are sawed off and the shoes put on, and the truss is ready for installation as soon as the glue dries.

The result is a much stronger and much less expensive truss. The cost runs between one-fourth and one-third less than the trusses made heretofore. Moreover, no expensive gluing bucks are used, and no bucks are tied up while the glue is drying.

Other objects and advantages of the invention will appear from the following description of a preferred embodiment given in compliance with 35 U. S. C. 112. This description is not intended to narrowly limit the invention, the details being given so that those skilled in the art will be able to construct a bowstring truss employing the principles of this invention.

In the drawings:

Fig. 1 is a view in side elevation of a completed bowstring truss which has been constructed according to the principles of the present invention;

Fig. 2 is a view in perspective of a portion of one end of the lower chord at the first assembly stage, when the web connections have been bolted in place on the lower chord;

Figs. 3 and 4 are two different isometric views of one of the connection members;

Fig. 5 is a view similar to Fig. 2 showing the next stage of constructions, with the webs bolted to the lower-chord connecting members and the upper-chord connecting members bolted to the webs, the upper ends of the webs sticking through the connecting members;

Fig. 6 is a view in side elevation showing the connection of the lower chord to the webs;

Fig. 7 is a view taken along the line 7—7 in Fig. 6;

Fig. 8 is a view similar to Fig. 5 showing the next stage of construction in which the first lamination of the outer chord is spiked to the webs;

Fig. 9 is a fragmentary view in perspective showing a portion of the second lamination with a ribbon of glue on its lower surface, ready for application to the first lamination;

Fig. 10 is a view in perspective of the end of the truss after the upper chord has been built up, but before the end has been sawed off;

Fig. 11 is an enlarged view in section taken at one of the webbed connections or a completed truss showing how the spiking was done;

Fig. 12 is a view in side elevation, reduced with respect to Fig. 11, of the connection of another pair of webs to the laminated upper chord;

Fig. 13 is a view in section taken along the line 13—13 of Fig. 12;

Fig. 14 is a view in elevation showing the connection of the single end web to the upper chord.

The bowstring truss 10 shown in Fig. 1 is made up of a lower horizontal chord 11, a curved laminated upper chord 12, and a plurality of radial webs or struts 13 and diagonal webs or struts 14 secured to the chords 11 and 12 by a plurality of connecting members 15 and 16. The construction is usually carried out on the ground or on a floor, with the truss 10 on its side during the construction.

The connecting members or buckets 15, 16 are described in detail in my application, Serial No. 274,613. As shown in Figs. 3 and 4, the connecting member 15 comprises a pair of spaced apart face plates 20, 21 adapted to be secured to the inner face of either chord 11 or 12. A pair of side plates 22, 23 are secured, preferably by welding, to the plates 20, 21 leaving an opening 24 through which the webs 13, 14 may pass so that they will directly contact the chords 11 and 12. The plates 20, 21, 22, 23 are all provided with suitable bolt openings 25, 27, and 28.

The construction of the truss 10 shown in Fig. 1 begins with the lower chord 11, which may be a single piece of lumber or may be laminated. The locations of the web connections 15 are laid out on the chord 11, and openings 30 for the bolts 26 are bored (Figs. 6 and 7). The connections 15 are then bolted in place, as in Fig. 2.

Meanwhile, other workmen have cut the webs 13 and 14 to their exact length, according to specifications laid out by the supervising engineer for the particular size of truss being built. Bolt openings 31, 32 for the webs 13, 14 are bored at the two ends of each web (Figs. 7, 11 and 13). Next, the webs 13, 14 are secured to the connecting members 15 on the lower chord 11 by bolts 33, and the outer connecting members 15, 16 are secured to the webs 13, 14 by bolts 34 (see Fig. 5 and also Figs. 6 and 7).

Construction of the upper chord 12 is begun by spiking the first lamination 40 to each of the webs 15, 16 by the nails 41, as shown in Figs. 8 and 11, usually beginning near the center. This is made possible by the novel connecting members 15, 16. The spike 41 passes through the thickness of the lamination 40 and into the center of the web member 13, 14 where the greatest strength is available. The first lamination 40 then lies against the base pieces 20, 21 of the connecting member 15 but no bolts are yet applied. The outer end 42 of the lamination 40 is allowed to extend free beyond the lower chord 11 at this time (Fig. 8). Butts 43 for the successive strips comprising the lamination 40 are located between the webs 13, 14 (see Fig. 8 and also see Figs. 11 and 12, where butts for other laminations are shown). When the first lamination 40 is in place, it and the webs 15, 16 and the lower chord 11 serve as the gluing buck or jig by which the glued laminated chord 12 is constructed.

A ribbon 44 of glue is then applied (Fig. 9) to what will be the lower face of the second lamination 45, the ribbon 44 preferably being somewhat narrower than the lamination 45 but extends from end to end. Any suitable glue, such as a casein or resin glue may be used. Experience will show how wide and how thick the ribbon 44 should be to obtain the proper thickness of glue without forcing too much glue out the side when pressure is applied. The second lamination 45 is then spiked by nails 46 to the lowest lamination 40, the glue 44 being in between the laminations. As before, butts 47 where the strips forming the lamination 45 end are preferably located in between where two webs 13, 14 come together (see Fig. 12), so that one strip 45a will be nailed to one web 13 and the other strip 45b is nailed to the other web 14. The nailing will be far enough to the edge to be strong. Preferably, the butts for different laminations are located at different places so that the butts are staggered (see Figs. 8, 11, and 12). As in the case of the lamination 40, the outer ends 48 of the lamination 45 are permitted to run free (see Fig. 10).

The upper chord is built up in this manner. Glue 49, 54, 59 is applied to the successive laminations 50, 55, 60, and each lamination 50, 55, 60 is then spiked to the preceding one by nails 51, 56, 61. (The thickness of of the layer of glue has been exaggerated somewhat in the drawing, Figs. 11–14, so that it will show at all.) Butt ends 52, 57, 62 may be provided as before, and the ends 53, 58, 63 of the laminations 50, 55, 60, run free (Fig. 8).

When all of the laminations have been spiked on, bolt holes 65 are bored through the whole chord at the web connections 15, in line with the openings 25, and bolts 66 are installed. Wherever the outer lamination 60 has a butt joint 62, steel strips 67 are secured against the outer chord face by the bolts (see Figs. 1, 12, and 13).

Since there is to be no separate glue press in the present invention, additional holes are bored in between the web connections 15, 16 and bolts 70 (Figs. 1 and 10) are inserted and tightened to give the required pressure. During the drying operation, there will be some shrinkage, because the moisture in the glue first swells the wood and later evaporates. Therefore all the bolts 66, 70 should be tightened again after the glue has dried, to give additional strength.

Even before the glue is dry, the end 71 of the upper chord may be cut off as shown in dotted lines in Fig. 10, and the shoe 72 may then be applied thereon, as shown in Fig. 1. Preferably the shoe 72 will be like the ones shown in my copending application, Serial No. 248,914, filed September 29, 1951.

When the shoe 72 is bolted to the lower chord, the truss 10 is complete, or will be when the glue dries. The glued upper chord 12 has been constructed inexpensively, without using special gluing machines or gluing bucks. In fact, the construction is considerably less expensive than the construction of a non-glued split upper chord, which was the least expensive prior-art structure. The whole truss is far stronger than split-chord trusses or any non-glued construction, so that materials may also be saved.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for constructing wooden trusses comprising the steps of securing the inner ends of wooden web members to a straight lower chord member; securing connecting members to the outer ends of said web members at the sides thereof, with the outer end of each connecting member substantially co-planar with the outer end of each of its said web members, each said web member extending through an opening in the outer end of said connecting member; spiking a first lamination of the other chord member to the outer end of each said web at the point where said web extends through said connecting member opening; building up subsequent laminations by spiking each one to the next preceding lamination until said other chord is built up; and then bolting the completed chord to the outer end of said connecting member.

2. A method for constructing wooden trusses comprising the steps of securing the inner ends of wooden web members to a straight lower chord member; securing connecting members to the outer ends of said web members at the sides thereof with the outer end of the connecting members substantially co-planar with the outer ends of their respective said web members, each said web member extending through an opening in the outer end of a said connecting member; spiking a first lamination of the other chord member to the outer end of each said web at the point where said web extends through said connecting member openings; applying a layer of glue over said first lamination; building up subsequent laminations by spiking each one to the next preceding lamination with a sandwich of glue therebetween, until said other chord is built up; setting the glue under pressure; and then bolting the completed chord to the outer end of said connecting member.

3. A bowstring truss, including in combination: a straight lower chord; an arcuate upper chord; a plurality of struts running between said upper and lower chords with their ends resting directly against the inner faces of said chords; and connecting members securing said struts and chords to each other, each said connecting member comprising a pair of first plates, one on each side of said strut parallel to said chords and bolted to said strut at one end thereof, and a pair of co-planar second plates spaced apart from each other and secured to said first plates at the chord ends thereof and lying against the inner face of said chord and bolted thereto, said strut extending through the space between said second plates into direct contact with the inner face of said chord; and nails joining each said strut to said chord where they are in contact.

4. A bowstring truss, including in combination: a straight lower chord; a laminated arcuate upper chord; webs extending between the opposite inner faces of said chords; and a connecting member at each connection between the upper chord and its webs, said connecting member comprising a pair of side plates bolted on opposite sides of each web and a pair of co-planar, spaced-apart face plates welded to said side plates and bolted to said upper chord, said web extending through the space between said face plates with its end contacting the inner face of said upper chord, the innermost lamination of said upper chord being spiked to the end of said web, whereby said truss may be constructed on said lower chord and webs as a frame, the later laminations being spiked to said first lamination, the complete said upper chord being bolted to said connecting member face plates.

5. A bowstring truss including in combination: a straight lower chord; a laminated generally arcuate upper chord; webs extending between the opposed inner faces of said chords; a connecting member at each connection between the upper chord and its webs, said connecting member comprising a face plate lying along the inner face of said chord and a pair of depending side plates welded to said face plate along each side edge thereof, on opposite sides of each web, and bolted thereto, said face plate having an enlarged generally rectangular opening therethrough, said web extending through said opening into direct contact with the inner lamination of said upper chord; spike means joining said web and said inner lamination; and bolt means joining the complete upper chord to said face plates on each side of said opening.

6. A method of constructing trusses, comprising the steps of securing web members at their inner ends to a first chord member; securing to the sides of said web members adjacent their outer ends, a plurality of connection members each having an opening through which the outer ends of the web members extend, said outer ends being in alignment and generally coplanar with the outer ends of their respective connecting members; spiking a first lamination of a second chord member to the outer ends of said web members; building up subsequent laminations by spiking each one to the next preceding lamination until said second chord member is built up; and then bolting said connection members to the completed second chord member through all the laminations thereof.

7. A method of constructing bowstring trusses comprising the following steps: bolting connection members to the inner face of the rectilinear lower chord while said chord lies on its side; bolting the inner ends of webs to said connection members, said webs being cut to length and so arranged that their outer ends lie along an arcuate path, some said webs lying perpendicular to and radial to said arcuate path and other webs lying diagonally so as to extend between the inner end of one radial web and the outer end of an adjacent radial web; bolting connection members to all said webs adjacent the outer ends of said webs, so that the outer ends of said webs extend therethrough, each web lying generally co-planar with the outer ends of its said connection member; spiking a first lamination of the arcuate upper chord to the outer ends of said webs and to the outer ends of said lower chord; spiking subsequent laminations over said first lamination until said upper chord is built up; and then bolting said connection members to the completed upper chord through all the laminations thereof.

8. A method of constructing trusses, comprising the steps of: securing web members at their inner ends to a first chord; securing to the sides of said web members, adjacent their outer ends, a plurality of connection members each having an outer end with an opening through which the outer ends of the web members extend, each said web outer end being in alignment and generally co-planar with the outer end of its connection member; spiking a first lamination of a second chord to the outer ends of said web members; placing a second lamination on top of said first lamination with glue in between the laminations and then spiking said second lamination to said first lamination; building up subsequent laminations by gluing and spiking each one to the next preceding lamination until said second chord is built up; and then bolting said connection members to the completed second chord through all the laminations thereof.

9. A method of constructing bowstring trusses comprising the following steps: bolting connection members to the rectilinear lower chord while said chord lies on its side; bolting the inner ends of webs to said connection members, said webs being cut to length and so arranged that their outer ends lie along an arcuate path, some said webs lying perpendicular to and radial to said arcuate path and others lying diagonally so as to extend between the inner end of one radial web and the outer end of an adjacent radial web; bolting connection members to all said webs adjacent their outer ends, so that the outer ends of said webs extend therethrough in alignment with the outer faces of said connection members; spiking a first lamination of the arcuate upper chord to the outer ends of said webs and to the outer ends of said lower chord: placing a second lamination over said first lamination with glue therebetween and spiking said second lamination to said first lamination; adding subsequent laminations by successively gluing and spiking them over preceding laminations until said upper chord is built up; and then bolting said connection members to the completed upper chord through all the laminations thereof.

10. A method of constructing trusses, comprising the steps of: securing the inner ends of web members to a first chord; securing to the sides of said web members, adjacent their outer ends, a plurality of connection members each having an outer end with an opening through which the outer ends of the web members extend, each said web outer end being in alignment and generally co-planar with the outer end of its said connection member; spiking a first lamination of a second chord to the outer ends of said web members; placing a second lamination on top of said first lamination with glue in between the laminations; spiking said second lamination to said first lamination; building up subsequent laminations by gluing and spiking each one to the next preceding lamination until said second chord is built up; drilling holes and bolting said connection members to the completed second chord through all the laminations thereof; drilling other holes through said second chord between connection members; and applying bolts through said holes and tightening all said bolts to give pressure while said glue dries.

11. A method of constructing bowstring trusses comprising the following steps: bolting connection members to the rectilinear lower chord while said chord lies on its side; bolting the inner ends of webs to said connection members, said webs being cut to length and so arranged that their outer ends lie along an arcuate path, some said webs lying perpendicular to and radial to said arcuate path and others lying diagonally so as to extend between the inner end of one radial web and the outer end of an adjacent radial web; bolting connection members to said webs adjacent the outer ends of said webs so that the outer ends of said webs extend therethrough in alignment with the outer faces of said connection members; spiking a first lamination of the arcuate upper chord to the outer ends of said webs and to the outer ends of said lower chord; placing a second lamination over said first lamination with glue therebetween; spiking said second lamination to said first lamination; adding subsequent laminations by successively gluing and spiking them over preceding laminations until said upper chord is built up; bolting said connection members to the completed upper chord through all the laminations thereof; applying and tightening additional bolts through said upper chord between connection members to apply pressure while said glue dries; and then tightening all said bolts after said glue dries to compensate for shrinkage.

12. A method of constructing trusses, comprising the steps of securing the inner ends of web members to a first chord; securing to the sides of said web members, adjacent their outer ends, a plurality of connection members each having an outer end face with an opening through which the outer ends of the web members extend, each said web outer end being in alignment and generally co-planar with the outer end face of its said connection member; spiking a first lamination of a second chord to the outer ends of said web members, said lamination being made up of successive strips, butt-ended at connection members where two web members meet, in between said web members, the outer ends of said lamination running free; placing a second lamination over said first lamination with glue therebetween; spiking said second lamination to said first lamination, said second lamination also being made up of strips butt-ended at the connection members between two web members, different locations being used for these butt-ends than for said first lamination, the outer ends being permitted to run free; building up subsequent laminations by gluing and spiking each one to the next preceding lamination until said second chord is built up, each lamination being made up of successive strips butt-ended, the butt-ends being staggered but always between two web members that meet at the same connection member; bolting said connection members to the completed second chord through all the laminations thereof, plates being provided over butt-ends of the outermost lamination; applying bolts through said second chord at locations in between said connection members to apply pressure to the glue; cutting off the free ends of said laminations along a section perpendicular to said second chord with its lower edge co-planar with the lower edge of said first chord; and securing the ends of said first and second chords together.

13. A method of constructing bowstring trusses comprising the following steps: bolting connection members to the rectilinear lower chord while said chord lies on its side; bolting the inner ends of radial and diagonal webs to said connection members, said webs being cut to length and so arranged that their outer ends lie along an arcuate path, some said webs lying perpendicular to, and radial to said arcuate path and others lying diagonally so as to extend between the inner end of one radial web and the outer end of an adjacent radial web; bolting second connection members to all said webs adjacent the outer ends of said webs, so that the outer ends of said webs extend therethrough in alignment with the outer faces of said connection members; spiking successive strips of wood to provide a first lamination of the arcuate upper chord to the outer ends of said webs and to the outer ends of said lower chord, the strips adjoining one another above a said second connection member, in between the diagonal web and the radial web connected thereto, the outer ends of said lamination extending free; placing a second series of strips constituting a second lamination over said first lamination with glue therebetween; spiking said second lamination to said first lamination, the adjoining ends of said strips being disposed as in said first lamination but at a different connection member, so that the ends are staggered, the outer ends extending free; adding subsequent laminations in the same manner until said upper chord is built up; bolting said connection members to the completed upper chord through all the laminations thereof; applying additional pressure bolts through all said laminations; cutting off the end of said upper chord generally perpendicularly to said upper chord and with its lower edge generally co-planar with the lower surface of the lower chord; and securing said upper and lower chords together at said ends.

14. A bowstring truss, including in combination: a straight lower chord; a laminated and glued arcuate upper chord; struts extending between the opposite inner faces of said chords; and a connecting member at each connection between the upper chord and its struts, said connecting member comprising a pair of side plates bolted on opposite sides of each strut and a pair of coplanar, spaced-apart face plates welded to said side plates and bolted to said upper chord, said strut extending through the space between said face plates with its end contacting the inner face of said upper chord, the innermost lamination of said upper chord being spiked to the end of said strut, the other laminations being spiked to said innermost lamination, with glue between successive laminations.

References Cited in the file of this patent

UNITED STATES PATENTS

| | | |
|---|---|---|
| 1,438,452 | Miller | Dec. 12, 1922 |
| 1,744,342 | Spink | Jan. 21, 1930 |
| 1,762,786 | McKeown | June 10, 1930 |
| 2,251,578 | Rietzke | Aug. 5, 1941 |

FOREIGN PATENTS

| | | |
|---|---|---|
| 7,559 | Australia | of 1928 |